United States Patent Office 3,067,260
Patented Dec. 4, 1962

3,067,260
GLYCOL SEPARATION PROCESS
John F. Nobis, Charles E. Frank, and Edwin A. Allgeier, Cincinnati, Ohio, assignors to National Distillers and Chemical Corporation, New York, N.Y., a corporation of Virginia
No Drawing. Filed Mar. 10, 1959, Ser. No. 798,329
7 Claims. (Cl. 260—637)

This invention relates broadly to an improved method for the separation of crude isomeric mixtures of glycols into relatively pure straight chain and branched chain components and for fractions thereof, and more particularly, to a novel and highly effective means for recovering relatively pure straight chain $C_8$–$C_{12}$ glycols from mixtures containing straight chain $C_8$–$C_{12}$ glycols together with branched chain isomers thereof.

It is an object of this invention to provide a novel, economical, and practical process for the production of pure straight chain glycols and branched chain glycols. It is another object of this invention to separate mixtures of crude glycols into their straight chain and branched chain components in substantially high yields and in substantially pure form. Additional objectives of the invention will become apparent from the ensuing description.

It has recently been found that an aliphatic conjugated diolefin can be treated with an alkali metal such as sodium or potassium, in finely dispersed form, in a selected liquid medium and, if desired, in the presence of a relatively small amount of a polycyclic aromatic hydrocarbon and/or in the presence of a selected solid, friable attrition agent at a temperature preferably below about 0° C. to produce a mixture comprised predominantly of dimetallo derivatives of the dimerized diolefins. This dimetallo product is then treated under selective reaction conditions with oxygen, an oxygen-containing chemical compound, or some other appropriate reactant to yield alkali metal salts of the corresponding unsaturated glycols. These salts are then "quenched" by the gradual addition of water or an alcohol such as methanol or ethanol to liberate the glycols from their alkali metal derivatives which are initially formed. The glycols are isolated from this reaction mixture by extraction, distillation, or other suitable means.

The glycol products thus derived may subsequently be hydrogenated preferably catalytically, thereby giving mixtures of crude, saturated glycols comprising both straight chain and branched chain components. Although important commercial applications have been developed for straight chain glycols and for branched chain glycols in many fields, for example, in the manufacture of solid propellants for rockets, in synthetic waxes and polishes, in the synthesis of plasticizers, synthetic lubricants, polyester resins and rubbers, polyurethanes, alkyds, and so forth, until now there has been no satisfactory means of separating such an isomeric mixture of glycols into its straight chain and its branched chain components. A novel and practical process has now been found which will effect such a separation, this process being based upon the unexpected discovery that the straight chain component of an isomeric mixture of glycols and the branched component are not equally soluble in certain selected solvents. More specifically, it has been found that straight chain glycols are relatively insoluble in certain liquid aromatic hydrocarbons, whereas branched chain glycols and associated impurities are relatively soluble at certain temperatures in these liquid aromatic hydrocarbons.

The starting diolefins for this process include any aliphatic conjugated diolefin such as, for example, butadiene, isoprene, dimethylbutadiene, the pentadienes such as the methyl-1, 3-pentadienes, and the like. In general, it is desirable to use a conjugated aliphatic diolefin having from 4 to 8 carbon atoms.

Either sodium, potassium, or lithium can be used as the alkali metal reactant. Sodium is preferred since it has been found that sodium gives excellent selectivity and yields of dimerized products; also it is cheaper and more readily available. Mixtures containing a major proportion of sodium are also useful.

One factor in the successful production of the initial dimerized derivatives from which the glycols are prepared is the use of the alkali metal in dispersed form. If bulk sodium is used instead of dispersed sodium, it either yields no product or results largely in the formation of highly condensed polymers from the diolefin. These unwanted polymers can be substantially avoided by employing the alkali metal as a dispersion. Such dispersions are most conveniently made in an inert hydrocarbon or ether preliminary to reaction with the diene.

The reaction medium most suitable for reaction of the diolefin with the alkali metal has been found to consist essentially of certain types of ethers. The ether medium can be any aliphatic monoether having a methoxy group in which the ratio of the number of oxygen atoms to the number of carbon atoms is not less than 1:4. Examples include dimethyl ether, methyl ethyl ether, methyl n-propyl ether, methyl isopropyl ether, and mixtures of these methyl ethers. Certain aliphatic polyethers are also satisfactory. These include the acyclic and cyclic polyethers which are derived by replacing all of the hydroxyl hydrogen atoms of the appropriate polyhydric alcohol by alkyl groups. Examples are the ethylene glycol dialkyl ethers such as the dimethyl, methyl ethyl, diethyl, methyl butyl, ethyl butyl, dibutyl, and butyl lauryl ethylene glycol ethers; trimethylene glycol dimethyl ether; glycerol trimethyl ether; glycerol dimethyl ethyl ether, and the like. Generally, simple methyl monoethers such as dimethyl ether and the polyethers of ethylene glycol such as ethylene glycol dimethyl ether are preferred. Hydrocarbon solvents such as isooctane, kerosene, toluene, and benzene cannot be used exclusively as the reaction media in the dimerization step, since they adversely affect the dimerization reaction of the diolefin and give little or no yield of dimer products.

The ethers used as reaction media should not contain any groups which are distinctly reactive toward sodium. In addition, the ether used must not be subject to extensive cleavage under the reaction conditions to yield irreversible reaction products during the dimerization process, since such cleavage not only destroys the ether, but also introduces into the reaction system metallic alkoxides which induce undesirable polymer-forming reactions with the diolefins.

Although it is prefered that the reaction medium consist substantially of the ethers specified, other inert liquid media can be present in limited amounts. In general, these inert media are introduced with the alkali metal dispersion as the liquid in which the sodium is suspended. These inert media have the principal effect of diluting the ethers. As such dilution increases, a minimum concentration of ether is reached below which the dimerization promoting effect is not evident. It is necessary to maintain the concentration of ether in the reaction mixture at a sufficient level that it will have a substantial promoting effect upon the diolefin dimerization reaction.

It has also been found highly useful to employ in conjunction with the dimerization reaction one or more techniques of activation for the dimerization process. This can be done in a number of ways and has the effect of increasing the rate reaction and making the reaction more selective. For instance, a relatively small amount of at least one compound of the polycyclic aromatic class can be included in the reaction mixture. Such a compound may be a condensed ring hydrocarbon such as naphthalene or phenanthrene or an uncondensed polycyclic compound such as diphenyl, the terphenyls, dinaphthyl, tetraphenyl ethylene, and the like. The polyphenyl compounds such as diphenyl, the terphenyls, and their mixtures have been found to be particularly useful. Concentrations in the range of 0.1 to 10 weight percent based on the amount of diolefins undergoing dimerization are ordinarily sufficient.

It has also been found advantageous to carry out the dimerization of the diolefin in the presence of at least one solid, friable attrition agent. These activating materials have been found especially valuable for increasing the reaction rate where the dimerization is done in attrition-type apparatus such as a ball mill or a pebble mill. Friable materials are those which are relatively easily pulverized in this type of apparatus. These materials can further be used either alone or in conjunction with the polycyclic aromatic compounds. Materials which are suitable for use as the solid friable attrition agents include inorganic solids such as alkali metal salts, for example, sodium chloride, sodium sulfate, and potassium sulfate. Also useful is the class of compounds which consists of metallic and nonmetallic oxides which are not reactive with metallic sodium under the reaction conditions, for example, sand (silicon dioxide), diatomaceous earth (Cellite), zircon, and rutile. Carbon, such as in the form of graphite, can also be used. The material can be utilized in a number of ways; for instance, it can be utilized by the addition to the reaction zone of a suitable attrition agent which has been preground or otherwise adjusted to a satisfactory, useful particle size. On the other hand, a relatively coarse size salt or oxide can be added to a pebble mill or a ball mill and, while in contact with the solid alkali metal, the friable attrition agent is ground down to effective size.

It is further highly desirable in the process that the reaction temperature in the dimerization step be held below 0° C. The temperature range between —20° and —50° C. is the preferred one for diolefin dimerization. At higher temperatures the enter diluents tend to yield cleavage products with the result that sufficient alkoxide by-products are formed to yield high molecular weight polymer products.

In the second step of the reaction, the dimerized product is treated with any suitable reactant such as oxygen to form the corresponding glycol. The dimerized product may also be treated with a suitable carbonyl compound such as an aldehyde, a ketone, or an organic ester, and mixtures thereof; specific examples include aliphatic aldehydes such as formaldehyde, paraformaldehyde, acetaldehyde, propionaldehyde, butyraldehyde, isobutyraldehyde, and the octylaldehydes such as 2-ethylhexaldehyde; aromatic and heterocyclic aldehydes such as benzaldehyde and furfural, salicylaldehyde, anisaldehyde, cinnamaldehyde, piperonal, vanillin, acrolein, and crotonaldehyde; ketones such as acetone, methyl ethyl ketone, diethyl ketone, acetophenone, benzophenone, methyl vinyl ketone, mesityl ketone, phorone, and benzoquinone. It is also possible to react the dimerized product with any appropriate aliphatic or aromatic epoxide, such as ethylene oxide, propylene oxide, a butylene oxide, or styrene oxide, or the reactant may be an epoxide derivative of a diene, such as butadiene epoxide or isoprene epoxide.

The reaction of the dimetallic diene compounds with one of the above reactants or mixture thereof is preferably carried out at a temperature below about +50° C., and preferably in the range of about —50° to 0° C.

While proportions of the various reactants are not critical, optimum yields of the dimetallic diene intermediate can be obtained only if the alkali metal is present in finely dispersed form and in amounts equivalent to or slightly in excess of the molecular equivalents of the diolefin employed. The same relative ratio of reactants is also effective in the reaction of the dimeric derivative with an epoxide or carbonyl compound or the like, with the restriction that at least two equivalents of the glycol-forming reactant are required for each molecule of dimetallic dimer.

Depending upon the reactants employed, a wide variety of glycol mixtures may be obtained. For example, where the initial reactants are butadiene and sodium and the glycols are prepared by using ethylene oxide, there results a mixture of $C_{12}$ unsaturated glycols i.e., alkanediols; after hydrogenation, the saturated glycols obtained include the straight chain glycol i.e. alkanediol, 1, 12-dodecanediol, and the branched chain glycols, i.e., alkanediols, 3,6-diethyl-1, 8-octanediol, and 3-ethyl-1, 10-decanediol. With formaldehyde, there results a mixture of $C_{10}$ unsaturated glycols; after hydrogenation, the saturated $C_{10}$ glycols i.e. alkanediols, obtained include the straight chain glycol, 1,10-decanediol, and the branched chain glycols, 2,5-diethyl-1,6-hexanediol and 2-ethyl-1, 8-octanediol. When other diolefins are used for the initial reaction, such as isoprene, dimethylbutadiene, pentadienes, and the like, the final products will vary accordingly.

Such crude glycol mixtures are generally composed primarily of $C_8$–$C_{12}$ straight and branched chain glycols and may contain also relatively small amounts of impurities such as residual hydrogenation catalyst; monohydric alcohols; polymeric glycols and alcohols; unsaturated glycols, hydrocarbons, and other materials which may have passed through the hydrogenation step without being hydrogenated; and the like. Solid impurities may be removed by filtering or centrifuging the crude mixture of glycols. Distillation of the crude mixture of glycols before hydrogenation, after hydrogenation, or, if desired, both before and after hydrogenation serves to remove most of the lower boiling hydrocarbons, monohydric alcohols, and polymeric impurities.

In accordance with the present invention, the total isomeric mixture of crude glycols, as, for example, a mixture obtained by the aforedescribed processes, is subjected to a treatment with a suitable liquid aromatic hydrocarbon under controlled conditions to recover selectively the substantially pure straight chain glycol; the remaining crude branched chain glycol mixture is then treated with a suitable liquid aliphatic hydrocarbon for the selective recovery of substantially pure branched chain glycols.

More specifically, one embodiment of the present invention comprises treating the isomeric mixture of crude glycols with an aromatic hydrocarbon, such as toluene, benzene, or xylene, at a temperature of about 0° to 60° C., preferably about 10° to 50° C., to dissolve the impurities and precipitate the straight chain glycol. Above a temperature of about 40° C. the branched chain glycols are substantially in solution while below about 40° C. they gradually form a separate oily layer. The crude straight chain component thus obtained is then isolated by any conventional means, such as by filtering or by centrifuging, and purified by washing with an aromatic hydrocarbon at below about 50° C., preferably about 40–45° C., to remove any contaminating liquid branched chain glycols, or by recrystallizing from the aromatic hydrocarbon. The aromatic solvent in the filtrates such as may be obtained from the initial step of separation and from the recrystallization step may be recovered by any appropriate means, such as by distilling at the boiling point of the solvent or by decanting from the branched chain glycol layer at room temperature. The remaining material is treated with an aliphatic solvent, such as heptane or hexane, preferably but not necessarily by liquid-liquid extraction technique, at a temperature between about room temperature, i.e., about 25° C., and the boiling point of the aliphatic solvent, thus yielding a mixture of substantially pure branched chain glycols. The aliphatic hydrocarbon solvent may be separated from the glycols by any convenient means, such as by decanting.

In another embodiment of the present invention, the total isomeric mixture of crude glycols is treated with a suitable liquid aromatic hydrocarbon, such as toluene, benzene, or xylene, at a temperature between about 40° C. and the boiling point of said aromatic hydrocarbon to dissolve substantially all of the glycols and impurities. This solution of crude glycols is then subjected to a temperature sufficiently low, i.e., about 0° to 35° C., preferably about 10° to 25° C., to precipitate substantially all of the straight chain glycol content of the mixture. This precipitate is then isolated by any convenient means, e.g., by filtering or centrifuging. It is then purified by recrystallizing from an aromatic solvent. The aromatic hydrocarbon may be removed by any known means, such as by distilling at the boiling point of the solvent or by decanting at room temperature. Substantially pure branched chain glycols are separated from the remaining crude mixture by treating the mixture with an aliphatic hydrocarbon, such as heptane or hexane, for example, by liquid-liquid extraction, at a temperature in the approximate range of room temperature, i.e., about 25° C., up to the boiling point of the aliphatic solvent. The aliphatic solvent may be separated from the glycols by any appropriate means, such as by decanting. Thus, by practice of the invention embodied herein, there results a selective separation of substantially pure straight chain glycol, e.g., 1,12-dodecanediol or 1,10-decanediol, and branched chain glycols, e.g., 3-ethyl-1, 10-decanediol and 3,6-diethyl-1, 8-octanediol or 3-ethyl-1, 8-octanediol and 2,5-diethyl-1, 6-hexanediol, from mixtures comprising same and contaminating materials difficulty removable therefrom by conventional separation means.

In carrying out the selective separation process of the present invention, the initial treatment for the selective removal of the straight chain glycol from the mixture comprising the straight chain glycol and isomers thereof is carried out in a suitable solvent consisting essentially of a liquid aromatic hydrocarbon. For this purpose, liquid aromatic hydrocarbons such as toluene, benzene, and xylene are particularly suitable, but other liquid aromatic solvents are contemplated for such use. In particular, the aromatic solvent employed should preferably, but not essentially, have a boiling point in the range of from about 80° to about 260° C. and should be liquid at room temperature.

In the subsequent step for the recovery of the branched chain isomers, liquid aliphatic hydrocarbon materials such as hexane are particularly suitable, but, if desired, other aliphatic hydrocarbon materials such as heptane, pentane, octane, isooctane, cyclohexane, and the like, having up to about 12 carbon atoms, or mixtures thereof, may be used. The amount of solvent used in such a separation process is not critical. It has been found, however, that optimum separation can be attained when the ratio of solvent to total glycols in each step is about 1:1 to 10:1, and preferably about 3:1 to 5:1.

In the initial step for separating the straight chain glycols from the mixtures containing them and their isomers, the total mixture is treated with an aromatic hydrocarbon solvent at either (a) a temperature of about 0° to 60° C., preferably about 10° to 50° C., or (b) a temperature between about 40° C. and the boiling point of the selected aromatic hydrocarbon solvent and then at a decreased temperature, that is, at a temperature between about 0° and 35° C., preferably about 10° to 25° C. Although comparable final results are obtainable with either (a) or (b), the second method, i.e. (b), is preferred since the branched chain glycols are more soluble in the aromatic hydrocarbon solvent at the higher temperature; thus substantially all of the crude mixture and the impurities go into solution at the higher temperature and, when the temperature is lowered to about 0° to 35° C., the straight chain glycol which separates is somewhat purer than that obtained by procedure a and therefore subsequently requires less further and extensive purification. Subsequent treatment with the aliphatic hydrocarbon solvent to obtain pure branched chain glycols takes place at a temperature between about room temperature, i.e., about 25° C., and the boiling point of the particular aliphatic hydrocarbon solvent employed.

The process of the present invention may be applied to any isomeric mixture of saturated aliphatic glycols having about 8 to 12 carbon atoms between the hydroxyl groups. The starting crude glycol mixture may be, for example, a $C_8$ glycol prepared from butadiene and sodium plus an oxygen-containing gas and comprising 1,8-octanediol, 1,6-octanediol, and 3,6-octanediol; a $C_{10}$ saturated aliphatic mixture prepared from butadiene and sodium plus formaldehyde and comprising 1,10-decanediol, 2,5-diethyl-1, 6-hexanediol, and 2-ethyl-1, 8-octanediol; or a $C_{12}$ saturated aliphatic mixture prepared from butadiene and sodium plus ethylene oxide and comprising 1,12-dodecanediol, 3-ethyl-1, 10-decanediol, and 3,6-diethyl-1, 8-octanediol.

Although the process of the present invention will be illustrated essentially in relation to mixtures of isomeric aliphatic, saturated $C_{10}$ and $C_{12}$ glycols obtained by the reaction of disodiooctadiene (the reaction product of butadiene with sodium) with formaldehyde or ethylene oxide, it is not intended that the process be limited to such an isomeric mixture. The process of separating such mixtures into their straight chain and branched chain components is equally applicable to any mixture of $C_8$–$C_{12}$ aliphatic saturated glycols, i.e., alkanediols.

The more detailed practice of the invention is illustrated by the following examples wherein parts are given by weight unless otherwise specified. These examples are illustrative only and are not intended to limit the invention in any way except as indicated by the appended claims.

*Example 1*

Disodiooctadiene was prepared from 3.0 moles of butadiene and 3.0 gram atomic weights of sodium in dimethyl ether reaction medium. The reaction was carried out by initially preparing finely divided sodium dispersion in isooctane and contacting the dispersion in the presence of the dimethyl ether reaction medium with butadiene in the presence of about 1 to 2 percent of terphenyl. A temperature of about −23° C. was used. About 1.2 moles of disodiooctadiene resulted from this reaction. When this initial reaction was complete, 3.0 moles of gaseous ethylene oxide were admitted to the mixture over a two-hour period while maintaining a reaction temperature of about −30° C. by refluxing the dimethyl ether. The disodium salts of the resulting $C_{12}$ glycols were treated with methanol and then with water to destroy any unreacted sodium and to liberate the unsaturated glycols from the corresponding sodium alkoxides. The layers were separated and the inert solvents removed from the organic layer. A mixture of 297 parts of the unsaturated $C_2$ glycols and 350 parts of water was hydrogenated in a hydrogenation bomb at 300 p.s.i.g. over a nickel catalyst. The resulting saturated $C_{12}$ glycols, comprising the straight chain glycol, 1,12-dodecanediol, and the branched chain glycols, 3,6-diethyl-1, 8-octanediol and 3-ethyl-1, 10-decanediol were then washed from the bomb with 200 parts of methanol and the mixture was filtered to remove the catalyst. After removal of the methanol and water, 239 parts of saturated glycols ($I_2$=4.13) were obtained. This quantity of mixed crude $C_{12}$ glycols was then treated with 400 parts of toluene for 2.5 hours at 10° C. After filtering, washing, and drying the precipitate, there was obtained 47.6 parts of 1,12-dodecanediol (M.P. 77–79° C., Hydroxyl No. 16.8). The toluene and branched chain glycol layers (from the filtrate) were separated, and the glycol layer (approximately comprising 20% 3,6-diethyl-1, 8-octanediol, 70% 3-ethyl-1, 10-decanediol, and 10%

1,12-dodecanediol) was extracted with 300 parts of hexane at room temperature, yielding 150 parts of pure, liquid, mixed $C_{12}$ branched chain glycols (Hydroxyl No. 16.3).

*Example 2*

A mixture of crude, saturated $C_{12}$ glycols (100 parts), prepared as in Example 1, was treated with 200 parts of toluene at 110° C. The temperature was then lowered to 10° C., thus precipitating the straight chain component of the mixture. This material was isolated by filtration and recrystallized from toluene, yielding 25 parts of substantially pure 1,12-dodecanediol (M.P. 78–79° C., Hydroxyl No. 16.5). The remaining crude mixture of branched chain glycols was separated from the toluene and purified by liquid-liquid extraction with hexane at room temperatures, yielding 68 parts of a mixture of substantially pure branched chain glycols (Hydroxyl No. 15.9).

*Example 3*

A suspension of 233 parts of mixed $C_{12}$ unsaturated glycols, prepared as in Example 1, in 500 parts of 95% ethanol was hydrogenated at 50 p.s.i.g. over a platinum oxide catalyst. Upon completion of the hydrogenation, the catalyst was removed and washed with two 25-part portions of hot ethanol to remove traces of 1,12-dodecanediol from the catalyst. The ethanol washings were then combined with the original filtrate and the ethanol stripped from the saturated glycols by distillation at 78° C. The resulting crude mixture of $C_{12}$ saturated glycols was then treated with 500 parts of benzene at 20° C. to precipitate the straight chain glycol out of the total glycol mixture. The precipitate was removed by filtration and washed with five 50-part portions of benzene at 45° C. to remove trace amounts of the branched chain glycols. The filtrate was then stripped of benzene by distillation at about 80° C. and the residue combined with the original filtrate containing the branched chain glycols. The liquid branched chain glycols were washed with two 50-part portions of isooctane at room temperature to remove traces of monohydric alcohols. The yield of 1,12-dodecanediol was 74.2 parts (M.P. 79–80° C., Hydroxyl No. 16.78). The yield of branched chain glycols, i.e., 3-ethyl-1, 10-decanediol and 3,6-diethyl-1, 8-octanediol, was 152.3 parts (B.P. 125–140° C./0.5 mm., Hydroxyl No. 16.64, $n_D^{25}$ 1.4632, $d_4^{25}$ 0.9203).

*Example 4*

Disodiooctadiene was prepared from 1.5 moles of butadiene and 1.5 gram atomic weights of sodium in dimethyl ether reaction medium as follows: a finely divided sodium dispersion in isooctane was contacted in the presence of dimethyl ether medium, with butadiene in the presence of 1 to 2 percent of terphenyl. A temperature of −30° C. was maintained. Approximately 1.4 moles of disodiooctadiene was obtained from this reaction. With the completion of the initial reaction, 2.18 moles of gaseous formaldehyde were admitted to the mixture over a period of three hours while maintaining a temperature of −30° C. The reaction mixture thickened during the addition of formaldehyde. The disodium salt of the $C_{10}$ glycols which formed were treated with methanol and then water to destroy any unreacted sodium and to liberate the unsaturated $C_{10}$ glycols from the sodium alkoxides. The layers were separated and the inert solvents removed from the organic layer. The residual oil (unsaturated $C_{10}$ glycols) was dissolved in methanol and hydrogenated in a hydrogenation bomb at 300 p.s.i.g. at 70° C. over a nickel catalyst. Removal of the catalyst and methanol gave 62.0% yield of saturated $C_{10}$ glycols, consisting of the straight chain glycols, 1,10-decanediol, and the branched chain glycols, 2,5-diethyl-1, 6-hexanediol and 2-ethyl-1, 8-octanediol. These saturated $C_{10}$ glycols were then treated with 300 parts of toluene for 2.5 hours at 10° C. After filtering, washing, and drying the precipitate, there was obtained 12.4 parts of 1,10-decanediol M.P. 70–71° C. (literature value 71.5°–72° C.). The toluene and branched chain glycol layers (from the filtrate) were separated, and the glycol layer extracted with 200 parts of hexane at room temperature, yielding 48 parts of pure, liquid, mixed $C_{10}$ branched chain glycols (Hydroxyl No. 19.41, calcd. 19.53).

While there are above disclosed but a limited number of embodiments of the invention presented herein, it is possible to produce still other embodiments without departing from the inventive concept. It is desired therefore that only such limitations be imposed upon the appended claims as are stated therein.

What is claimed is:

1. A process for the separation and recovery of a straight chain alkanediol fraction and a branched chain alkanediol fraction from a mixture of crude saturated isomeric alkanediols having 8 to 12 carbon atoms between the hydroxyl groups which comprises initially admixing said crude isomeric mixture with a liquid aromatic hydrocarbon at a temperature between about 0° and 60° C. to precipitate the straight chain alkanediol fraction, recovering the straight chain alkanediol from the resulting aromatic hydrocarbon layer and the branched chain alkanediol layer, separating the aromatic hydrocarbon layer from the branched chain alkanediol layer, subsequently washing the layer containing the branched chain alkanediols with a liquid saturated aliphatic hydrocarbon having up to about 12 carbon atoms at a temperature between about room temperature and the boiling point of the aliphatic hydrocarbon, and recovering the branched chain alkanediol fraction.

2. The process of claim 1, wherein the starting material is a mixture of crude saturated isomeric $C_{12}$ alkanediols and the separated products are the straight chain alkanediol 1,12-dodecanediol and a mixture of the branched chain alkanediols 3-ethyl-1,10-decanediol and 3,6-diethyl-1,8-octanediol.

3. The process of claim 1 wherein the aromatic hydrocarbon is toluene.

4. The process of claim 1 wherein the aromatic hydrocarbon is benzene.

5. The process of claim 1 wherein the aliphatic hydrocarbon is hexane.

6. A process for the separation and recovery of the substantially pure straight chain alkanediol fraction from a mixture of crude saturated isomeric alkanediols having 8 to 12 carbon atoms between the hydroxyl groups, said mixture containing a straight chain alkanediol fraction and its branched chain isomers, which comprises admixing said crude saturated isomeric mixture with a liquid aromatic hydrocarbon at a temperature between about 0° and 60° C. to precipitate impure straight chain alkanediol fraction from said branched chain alkanediol fraction, said precipitated straight chain alkanediol fraction being admixed with trace amounts of branched chain isomers, separating the resulting precipitate from the liquid aromatic hydrocarbon phase, and washing said impure precipitate with a liquid aromatic hydrocarbon at a temperature of at least about 40° C. to remove the branched chain isomers, thus obtaining the substantially pure straight chain alkanediol fraction.

7. A process for the separation and recovery of substantially pure 1,12-dodecanediol from a mixture of crude saturated isomeric $C_{12}$ alkanediols, said mixture containing 1,12-dodecanediol, 3-ethyl-1,10-decanediol, and 3,6-diethyl-1,8-octanediol, which comprises (1) admixing said crude isomeric mixture with benzene at about 20° C.; (2) removing the resulting precipitate from the resulting layers of (a) benzene and (b) 3-ethyl-1,10-decanediol and 3,6-diethyl-1,8-octanediol by filtration; (3) washing said precipitate with benzene at about 45° C. to yield substantially pure 1,12-dodecanediol, said wash benzene containing trace amounts of 3-ethyl-1,10-decanediol and 3,6- diethyl-1,8-octanediol; (4) vaporizing at least a part of the wash benzene; (5) separating layer *a* from layer *b* of step 2; (6) combining the resultant residue of step 4 containing trace amounts of 3-ethyl-1,10-decanediol and 3,6-diethyl-1,8-octanediol with layer *b* containing the bulk of the 3-ethyl-1,10-decanediol and 3,6-diethyl-1,8-octanediol; and (7) washing the combined residue and layer *b* with isooctane at about room temperature to yield a mixture of substantially pure 3-ethyl-1,10-decanediol and 3,6-diethyl-1,8-octanediol.

References Cited in the file of this patent

UNITED STATES PATENTS

| | | |
|---|---|---|
| 2,803,672 | Sargent | Aug. 20, 1957 |
| 2,850,540 | Frank et al. | Sept. 2, 1958 |